Aug. 30, 1955   W. T. ILFREY ET AL   2,716,341
TANK DEPTH AND TIME RECORDING MECHANISM
Filed Sept. 13, 1954   3 Sheets-Sheet 1

INVENTORS.
William T. Ilfrey,
Martin E. True,
BY
ATTORNEY.

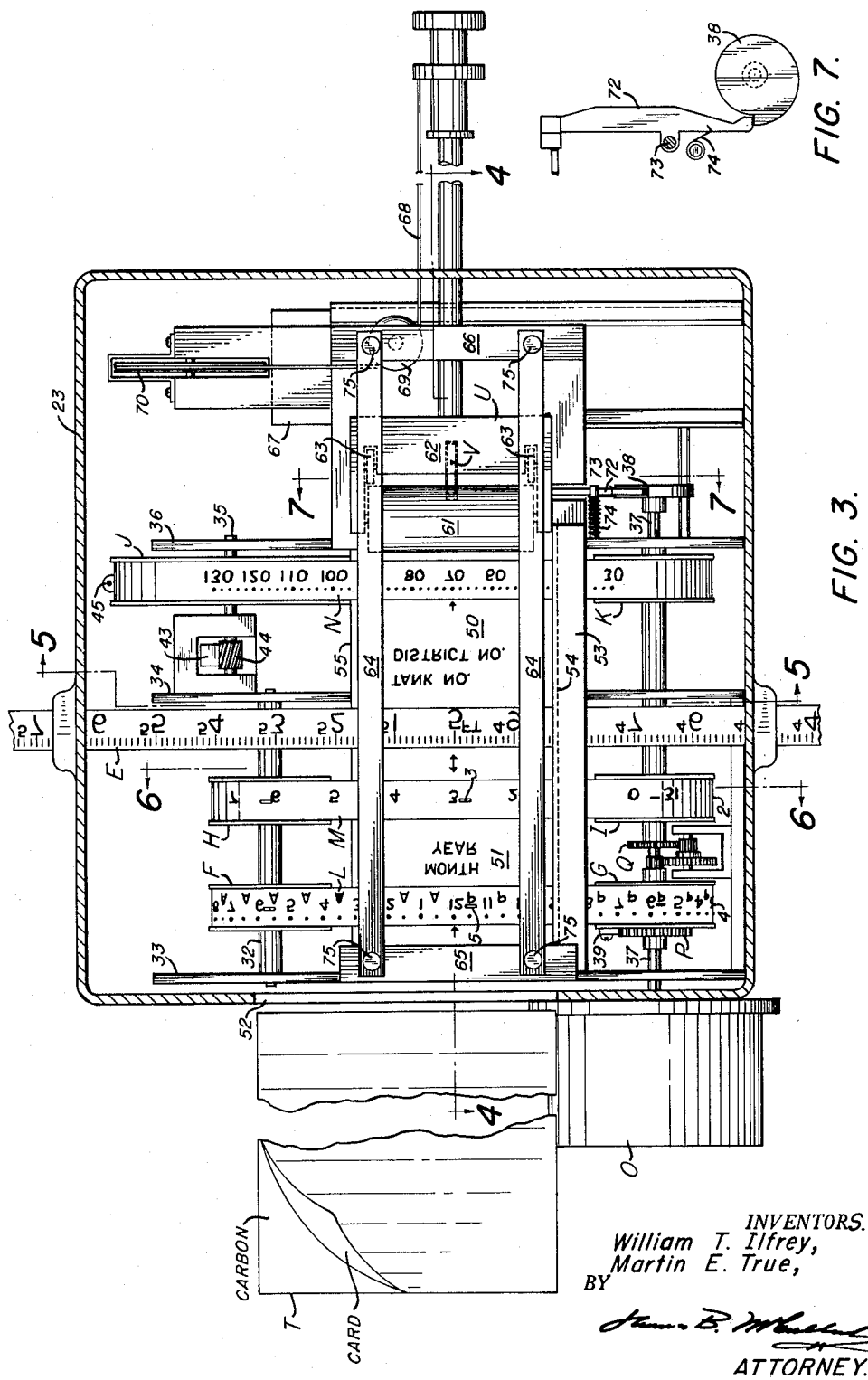

Aug. 30, 1955   W. T. ILFREY ET AL   2,716,341
TANK DEPTH AND TIME RECORDING MECHANISM
Filed Sept. 13, 1954   3 Sheets-Sheet 3
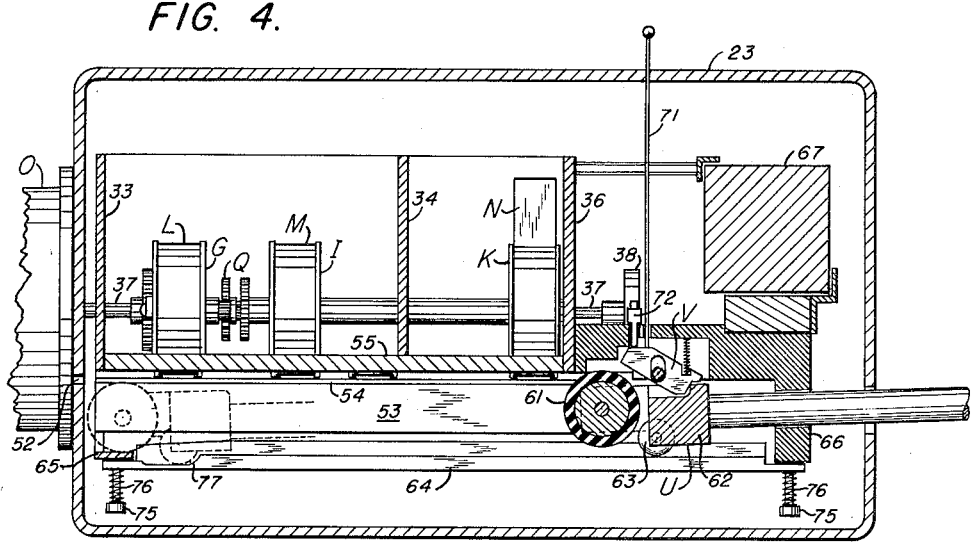
FIG. 4.
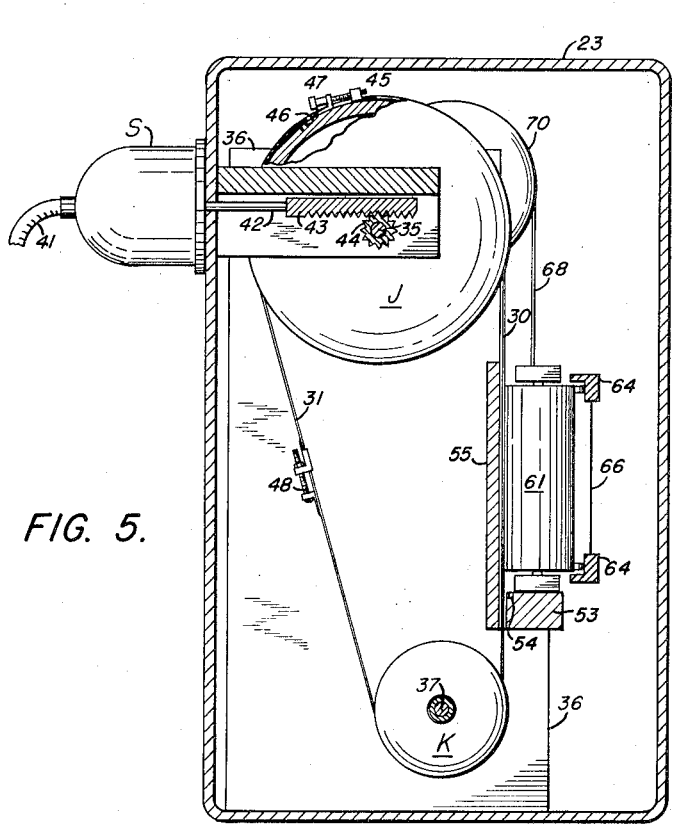
FIG. 5.
FIG. 6.
INVENTORS.
William T. Ilfrey,
Martin E. True,
BY
ATTORNEY.

United States Patent Office 2,716,341
Patented Aug. 30, 1955

2,716,341

TANK DEPTH AND TIME RECORDING MECHANISM

William T. Ilfrey, New Orleans, La., and Martin E. True, Houston, Tex., assignors, by mesne assignments, to Esso Research and Engineering Company, Elizabeth, N. J., a corporation of Delaware Application September 13, 1954, Serial No. 455,498

3 Claims. (Cl. 73—312)

This application is directed to a recording tank gauge in which the level of liquid in the tank and the time of day is recorded on a record sheet by means of embossed or raised face tape. In addition, other information may be recorded on the record sheet, such indications being the temperature within the tank, the day of the month, the tank number and the month and year.

Advantages and objects of the present invention will be seen from the following description taken in conjunction with the drawing in which:

Fig. 3 is an elevation with parts taken away showing the construction of the recording mechanism of Fig. 1;

Fig. 4 is a view taken along line 4—4 of Fig. 3;

Fig. 5 is a view taken along line 5—5 of Fig. 3;

Fig. 6 is a view taken along line 6—6 of Fig. 3;

Fig. 7 is a view taken along line 7—7 of Fig. 3; and

Figure 1:
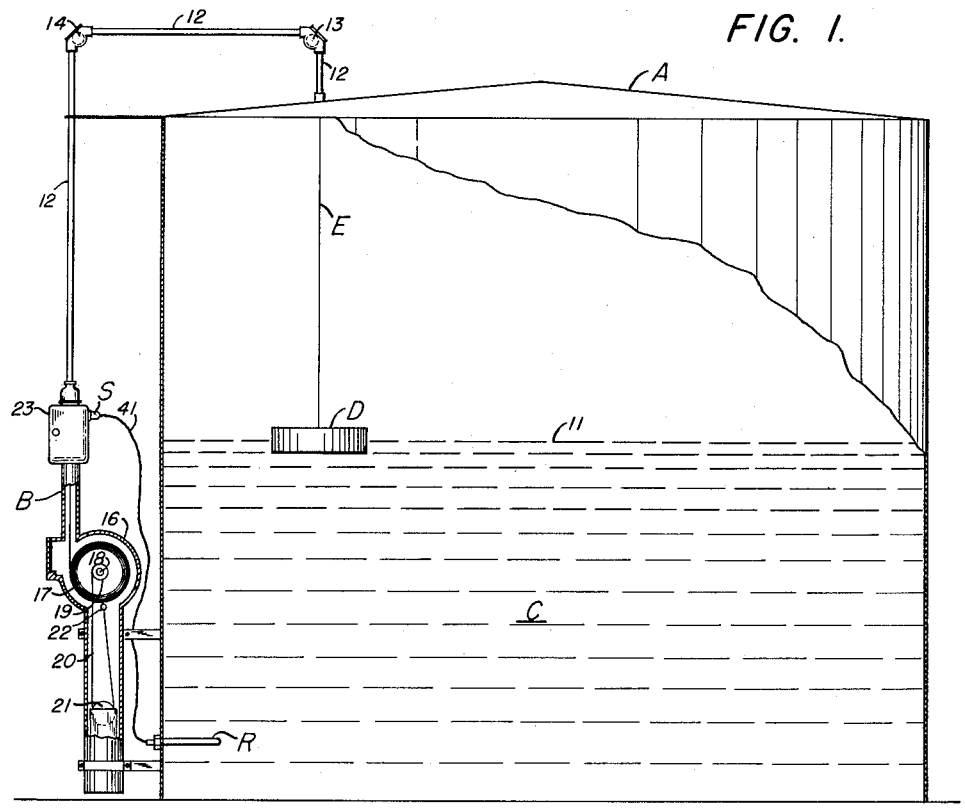
Fig. 1 is in the form of an elevation, partly in section, showing an embodiment of the device mounted on a tank in position for recording the level of liquid in the tank.

Turning now specifically to the drawing and first to Fig. 1, a storage tank A such as a type suitable for storing crude oil has mounted thereon housing B. The tank contains a body of liquid C and floating on the surface 11 of liquid C is float D. A tape E which preferably is made of a non-corrosive material of substantial durability such as stainless steel has one end attached to float D and runs through tubing 12, over pulleys 13 and 14 and down into housing B.

Figure 2:
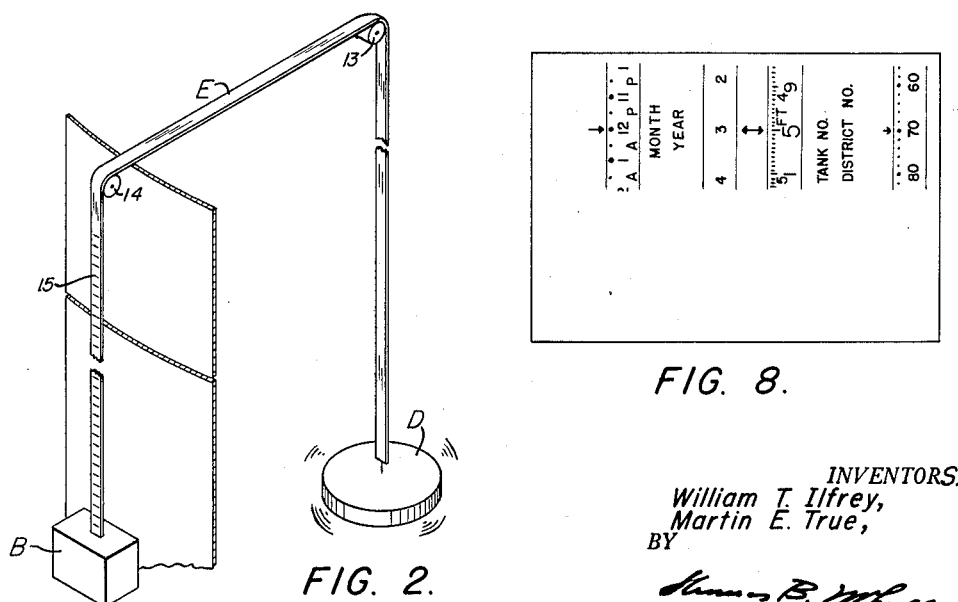
Fig. 2 is a fragmentary view showing the tape with float which forms a portion of the combination of Fig. 1.

A view of the tape E showing its relationship with float D and pulleys 13 and 14 is shown in Fig. 2. The portion of tape E below pulley 14 is provided with a suitably embossed or raised face scale 15. The embossed or raised face portion 15 of the tape terminates below pulley 14 and the remainder of tape E is smooth so that in use the raised face portion 15 never passes over pulley 14 and hence never enters tank A.

Details of construction of the recording mechanism are shown in Fig. 1 and in Figs. 3 to 7, inclusive. Arranged in section 16 of housing B is reel 17 mounted for rotation on shaft 18. Reel 17 is provided with a tension producing device to keep tape E constantly under tension to eliminate slackness in the tape which could result in inaccurate readings. In the embodiment shown, the tension producing device for reel 17 is a shaft 19 secured to reel 18 by suitable means with a line 20 having one end wrapped around shaft 19 and passing downwardly and around weighted pulley 21 and upwardly to anchor means 22. It will be understood that some other tension providing means such as a spring mechanism may be provided if desired.

Referring now to Fig. 3 and particularly to section 23 of housing B, pairs of pulleys F, G, H, I and J, K are mounted therein. Mounted on the pair of pulleys F, G is endless embossed tape L. Mounted on pair of pulleys H, I is endless embossed tape M and mounted on pair of pulleys J, K is an embossed tape N which is made up of parts 30 and 31 (see Fig. 5).

Pulleys F and H are mounted on shaft 32 so that they rotate independently of one another as by being slidably mounted on the shaft, the shaft in turn being supported by mounting members 33 and 34. Pulley J is carried on shaft 35 and is secured thereto for rotation with shaft 35, the ends of the shaft being journalled on supporting means 34 and 36.

In the lower portion of member 23 of housing B a drive shaft 37 is arranged to be driven by clock O. Mounted on shaft 37 and operatively connected therewith through connecting assembly P is pulley G. Mounted on shaft 37 and operatively connected therewith through train of gears Q is pulley I. The end of shaft 37 carries a cam member 38. Pulley K is slidably mounted on shaft 37 so that the shaft merely serves as a convenient mounting means for pulley K. Pulley I has its periphery provided with spaced projections 2 which fit into corresponding slots 3 in tape M as shown in Figs. 3 and 6. Similarly, pulley G is provided with projections 4, which fit into corresponding perforations 5 in tape L.

In the embodiment shown, the scale of endless scale L is so proportioned and is driven by clock O that it indicates the time in hours and minutes that a recording is taken. Adjustment assembly P allows the time indicated by the tape L to be adjusted without altering the positions of tape M or cam 38. The scale of tape M is embossed and driven at such a rate through gear train Q from clock O as to indicate the day of the month the record is taken.

A suitable temperature indicating means R, as shown in Fig. 1, which may, for example, be a thermocouple is located within tank A and is operatively connected through electrical conducting unit 41 to solenoid unit S. Since solenoids are well known to the art, the details of construction of solenoid S are not shown in order to simplify the drawing. As seen in Fig. 5 of the drawing, a solenoid unit S is provided with a shaft 42 terminating in rack 43 which in turn drives pinion gear 44. Pinion gear 44 is mounted on shaft 35 for rotation therewith and drives pulley J. Embossed tape N consists of two sections 31 and 30. Section 31 is fixed to pulley J by suitable means such as pins 46 and the adjacent ends of sections 30 and 31 are connected together by screw connections 47 and 48. This arrangement allows the position of the embossed face of tape N to be shifted for initially adjusting the reading with the signal produced from temperature indicating means R and solenoid assembly S.

In addition to tape E and tapes L, M, and N, additional recording means may be provided. For example, plate 50 may be mounted in section 23 of housing B between tapes E and N to indicate the month, year, tank number and district number and a plate 51 may be arranged between tapes L and M to indicate the month and the year, plate 51 being changed monthly.

Carried by section 23 of housing B is a card receiving slot 52, shown in Figs. 3 and 4, and mounted within section 23 of housing E is a guide member 53 having a surface 54 which serves as a bottom guide for the card. A plate 55 is carried by the housing and serves as a backup member for the assembly T. The embossed faces of tapes L, M, E, and N and plates 50 and 51, are arranged in a single plane. The slot 52, guide member 53, backup member 55 and the embossed units L, M, E, N, and plates 50 and 51 are adapted to receive a carbon and card assembly T as shown in Fig. 3. Carbon and card assemblies are common to the art. As will be seen, the assembly is adapted to fit slidingly between plate 55 and the embossed members L, M, E, N, plates 50 and 51 with bottom of assembly T resting on guide surface 54.

A printing assembly U consists of roller 61 mounted on yoke 62 which carries rollers 63, 63 which are mounted to move along guide members 64, 64. The guide members 64, 64 are spring mounted by means of screws 75, 75 and springs 76, 76 to mounting members 65 and 66 which in turn are secured to section 23 of housing B. The spring mounting means for guide members 64, 64 insure that a bias is continually exerted on roller 61 so that as it passes along the printing members, tapes L, M, E and N and plates 50 and 51 sufficient pressure is exerted against these members to cause a record to be printed on the carbon and card assembly T. A cam surface 77 allows this tension to be released as the roller 61 moves into its second position so that the card and carbon assembly is free to be removed from or inserted into the device when the printing roller 61 is in its second or final position as indicated by dashed lines. An operating means is provided for moving roller 61, the operating means shown being a weight 67 connected by line 68 to the shaft of yoke 62, said line being trained over pulleys 69 and 70. Releasable latch V is arranged to hold assembly U in its cocked position as shown in Fig. 4 and is arranged to be released either manually by the use of actuating rod 71 or automatically by the actuation of cam 38 which is driven by clock O and which releases latch V by actuating pivoted lever arm 72 which is pivotally mounted on pin 73 and has one end in contact with latch V and the other end in contact with cam 38 with spring 74 exerting a bias thereon. When latch V is released it allows roller 61 to be moved from its initial or first position as shown in full lines to its second or final position as indicated by dashed lines. As printing member 61 is moved from its first position to its second position, it causes card assembly T to be forced against the printing indicia so that there is recorded on the card the temperature of the tank, the tank number and district number, the depth of liquid in the tank, the time of day, the month and day of the month and the year.

Figure 8:
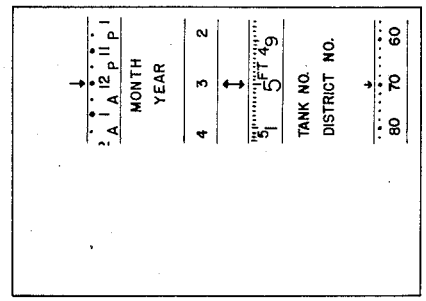
Fig. 8 is a view showing a record typical of that which may be obtained from the operation of the device shown by Figs. 1 to 7, inclusive.

A card typifying the type of record printed by the device on the card of a card and carbon assembly T is shown in Fig. 8.

When using the device it normally will be employed to obtain the liquid depth of a tank automatically at a predetermined hour. When it is used in this manner the cam 38 is adjusted or set so that it releases latch V at the selected time. When cam 38 is adjusted or set as described, the operator, usually a tank gauger, places the assembly U in its initial or cocked position where it is retained by latch V and then places a card and carbon assembly T in position between the printing members L, M, E, N, plates 51 and 50 and backup plate 55. Thereafter, clock O drives cam 38 so that it reaches its release position at the predetermined time. At this time latch V is actuated by cam 38 and causes the assembly U to be released so that printing roller 61 moves from its first position to its second position. As it moves through its path from its first position to its second position it causes to be printed upon the card the temperature of the tank, the tank number and district number, the height of liquid in the tank, the day of the month, the month and the year and the time of day. Thereafter the gauger in making his regular rounds finds the printing assembly U in its second position. He removes the card and carbon assembly T from the housing, returns assembly U to its first position and inserts a fresh card and carbon assembly T in the device whereby the device is ready to make a record at the same selected time the following day. However, if desired, a record may be taken at any time desired by an operator. When the operator wishes to take a record at will, the assembly U must be in its initial or cocked position and card and carbon assembly T in position in the housing whereupon the operator may release catch V by manually operated rod 71 to allow printing roller 61 to be moved by the energy stored up in weight 67 from its initial position to its final position. After this record has been made, the device may then be reset to take a record automatically if desired by returning assembly U to its initial position, removing the card and carbon assembly T which has been printed and replacing it with a fresh assembly T. When the device has been reset the record will then be made by the operation of clock O at the predetermined time as previously explained.

While a specific embodiment of the present invention has been shown and described, it will be obvious to a workman skilled in the art that various changes may be made in the sizes, shapes and proportions of parts of the combination without departing from the scope of the invention. The invention claimed is:

1. A device for recording the liquid level in a tank comprising, in combination, a housing adapted to be mounted on the outside of a tank, a reel carried by said housing, a tension exerting means operatively connected to said reel, a tape having its first end adapted to be secured to a float within the tank and its second end secured to said reel and adapted to extend from said reel over a pulley mounted with its axis parallel to and at an upper part of the tank with that portion of the tape between said pulley and said reel when the float is in its lowermost position in the tank provided with an embossed face which is a scale, a clock mechanism carried by said housing having a drive shaft, a second tape having an embossed face operatively connected to the drive shaft of said clock to be driven thereby with embossed face portions of the first and second tapes lying in a common plane, guide means carried by said housing for receiving a record sheet with a face adjacent said common plane in which said portions of tapes lie, a printing member, actuating means carried by said housing carrying said printing member and arranged to move the printing member from a first position to a second position, the path of movement from the first position to the second position causing it to exert a bias upon a portion of the embossed face portion of each of said tapes to force said portions of tapes against the record sheet in said guide means.

2. A device for recording the liquid level in a tank comprising, in combination, a housing adapted to be mounted on the outside of a tank, a reel carried by said housing, a tension exerting means operatively connected to said reel, a depth measuring tape having its first end adapted to be secured to a float within the tank and its second end secured to said reel and adapted to extend from said reel over a pulley mounted with its axis parallel to and at an upper part of the tank with that portion of the tape between said pulley and said reel when the float is in its lowermost position in the tank provided with an embossed face which is a scale, first and second equal diameter pulleys mounted parallel coaxially on said housing and forming a first group, third and fourth equal diameter pulleys mounted parallel and coaxial on said housing and forming a second group with the axes of the first and second groups parallel, an endless recording tape encircling the first and second pulleys arranged to be driven by said second pulley, a second recording tape encircling said third and fourth pulley and arranged to be driven by said fourth pulley with portions of said first and second recording tapes and a portion of the depth measuring tape lying in a common plane, guide means carried by said housing for receiving a record sheet with a face adjacent said common plane in which said portions of tapes lie, a clock with a drive shaft operatively connected to said second and fourth pulleys for rotating them, a printing member, actuating means carried by said printing member and arranged to move said printing member through a path from a first position to a second position, the movement of the printing member through the path to its second position causing it to exert a bias in turn on a portion of the embossed face portions of each of said tapes to force said portions of tapes against a record sheet in said guide means.

3. A device in accordance with claim 2 in which a fifth and sixth pulley are arranged coaxially respectively with the first group and second group of pulleys and in which a recording tape with one end anchored to the fifth pulley is trained over the fifth pulley so that a portion lies in said common plane in which portions of the other tapes lie and in which temperature indicating means are operatively connected to said fifth pulley for giving it angular movement.

References Cited in the file of this patent

UNITED STATES PATENTS

| | | |
|---|---|---|
| 619,667 | Campbell | Feb. 14, 1899 |
| 776,315 | Friez | Nov. 29, 1904 |
| 981,421 | Hess | Jan. 10, 1911 |
| 1,182,765 | Hess | May 10, 1916 |
| 1,741,792 | Rinehart | Dec. 31, 1929 |
| 2,496,686 | Williams | Feb. 7, 1950 |
| 2,568,348 | McCauley | Sept. 18, 1951 |